United States Patent
Lu et al.

(10) Patent No.: US 12,157,115 B2
(45) Date of Patent: Dec. 3, 2024

(54) RHODIUM-DOPED STRONTIUM TITANATE INVERSE OPAL MATERIAL, PREPARATION METHOD THEREOF, AND APPLICATION THEREOF IN PIEZOELECTRIC SYNERGISTIC PHOTOCATALYTIC REMOVAL OF ORGANIC POLLUTANTS

(71) Applicant: SOOCHOW UNIVERSITY, Suzhou (CN)

(72) Inventors: Jianmei Lu, Suzhou (CN); Najun Li, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 398 days.

(21) Appl. No.: 17/623,974

(22) PCT Filed: Oct. 9, 2020

(86) PCT No.: PCT/CN2020/120049
§ 371 (c)(1),
(2) Date: Dec. 30, 2021

(87) PCT Pub. No.: WO2021/068905
PCT Pub. Date: Apr. 15, 2021

(65) Prior Publication Data
US 2022/0347666 A1    Nov. 3, 2022

(30) Foreign Application Priority Data
Oct. 10, 2019   (CN) .......................... 201910960100.1

(51) Int. Cl.
*B01J 35/00*      (2024.01)
*B01J 21/06*      (2006.01)
(Continued)

(52) U.S. Cl.
CPC ............. *B01J 35/39* (2024.01); *B01J 21/063* (2013.01); *B01J 23/02* (2013.01); *B01J 37/0217* (2013.01);
(Continued)

(58) Field of Classification Search
None
See application file for complete search history.

(56) References Cited

U.S. PATENT DOCUMENTS

| | | | |
|---|---|---|---|
| 2007/0063208 A1* | 3/2007 | Klimov | B82Y 20/00 257/97 |
| 2008/0220153 A1* | 9/2008 | Mukherjee | H01G 4/33 427/126.3 |

(Continued)

FOREIGN PATENT DOCUMENTS

| | | |
|---|---|---|
| CN | 107159295 A | 9/2017 |
| CN | 107552033 A | 1/2018 |
| CN | 110743541 A | 2/2020 |

OTHER PUBLICATIONS

Wahab, comparing Pt/SrTiO3 to Rh/SrTiO3 for hydrogen photocatalytic production from ethanol, applied petrochemical research, 3, 83-89 (Year: 2013).*

(Continued)

*Primary Examiner* — Stefanie J Cohen
(74) *Attorney, Agent, or Firm* — SZDC Law PC

(57) ABSTRACT

Monodisperse polystyrene microspheres are self-assembled on a conductive surface of FTO glass by vertical deposition method to prepare three-dimensional ordered photonic crystal opal template; the three-dimensional ordered photonic crystal opal template is immersed in a solution containing rhodium source, titanium source and strontium source, and is then calcined to prepare a rhodium doped strontium titanate inverse opal material; and the rhodium doped strontium titanate inverse opal material is added to water con- (Continued)

taining pollutants, and is then subjected to illumination and/or ultrasonic treatment to complete the removal of the pollutants in the water. The three-dimensional ordered macroporous rhodium doped strontium titanate inverse opal material may be applied in the field of photocatalysis. Under the action of external force, a built-in electric field formed by the spontaneous polarization of the material may effectively separate the photo-induced carriers, which may thus enhance the photocatalytic performance and improve the photocatalytic efficiency.

2 Claims, 3 Drawing Sheets

(51) Int. Cl.
*B01J 23/02* (2006.01)
*B01J 35/39* (2024.01)
*B01J 37/02* (2006.01)
*B01J 37/08* (2006.01)
*C02F 1/72* (2023.01)
*C02F 101/30* (2006.01)

(52) U.S. Cl.
CPC ............... *B01J 37/08* (2013.01); *C02F 1/725* (2013.01); *B01J 2523/24* (2013.01); *B01J 2523/47* (2013.01); *B01J 2523/822* (2013.01); *C02F 2101/30* (2013.01); *C02F 2305/10* (2013.01)

(56) References Cited

U.S. PATENT DOCUMENTS

2012/0286643 A1* 11/2012 Ozin .................. H01K 1/14
445/27
2015/0251172 A1* 9/2015 Tokudome ............... B01J 35/19
502/328

OTHER PUBLICATIONS

K Yu et al., "Novel three-dimensionally ordered macroporous SrTiO3photocatalysts with remarkably enhanced hydrogen productionperformance" Applied Catalysis B: Environmental 200 (2017) 514-520 (Jul. 27, 2016).

F Yan et al., "Studies on the Formation Energies and Electronic Structures of Rh Doped SrTiO3" Journal of Synthetic Crystals, 2016, vol. 45, Issue (1): 279-284 (Jan. 31, 2016).

* cited by examiner

RHODIUM-DOPED STRONTIUM TITANATE INVERSE OPAL MATERIAL, PREPARATION METHOD THEREOF, AND APPLICATION THEREOF IN PIEZOELECTRIC SYNERGISTIC PHOTOCATALYTIC REMOVAL OF ORGANIC POLLUTANTS

This application is the National Stage Application of PCT/CN2020/120049, filed on Oct. 9, 2020, which claims priority to Chinese Patent Application No. 201910960100.1, filed on Oct. 10, 2019, which is incorporated by reference for all purposes as if fully set forth herein.

FIELD OF THE INVENTION

The invention belongs to the technical field of inorganic nano materials and piezoelectric synergistic photocatalysis, in particular to a preparation method of three-dimensional ordered macroporous rhodium doped strontium titanate inverse opal material responsive to visible light and its application in piezoelectric synergistic visible light photocatalysis degradation of organic pollutants in water body.

BACKGROUND OF THE INVENTION

With the rapid development of industrialization and the rapid increase of sewage discharge, the problem of water pollution is becoming more and more serious. Traditional wastewater treatment methods usually have the characteristics of high energy consumption and can not be compatible with the environment. Therefore, it is necessary to find efficient and green wastewater treatment methods to treat the environment. Recently, many safe, effective and green remediation methods have been reported to eliminate organic pollutants in the aquatic environment, including physical adsorption, chemical oxidation, biodegradation and so on. Among these methods, photocatalytic degradation is considered to be the most potential choice because of its environmental friendliness, high efficiency, relatively low cost and simple operating conditions.

However, some single component photocatalysts have some defects in application, such as high photogenerated electron-hole recombination rate, which leads to their low photo-quantum efficiency and low photocatalytic performance. Strontium titanate ($SrTiO_3$) is a perovskite photocatalytic material, which has the advantages of high stability, good acid and alkali resistance, no anodic light corrosion after illumination, rich sources, safety, non toxicity and low cost. At the same time, it also has excellent ferroelectric, piezoelectric and photoelectric properties, so it has been widely studied. However, strontium titanate can only absorb ultraviolet light in sunlight due to its broad band gap, which greatly limited its practical application.

SUMMARY OF THE INVENTION

The object of the present invention is to provide a three-dimensional ordered macroporous inverse opal material responsive to visible light, and to use a relatively cheap chloride of transition metal rhodium to replace precious metals such as gold, platinum and palladium to modify strontium titanate by micro doping, so as to solve the problem of high cost. At the same time, the material disclosed by the invention can quickly and efficiently degrade organic pollutants in water through piezoelectric synergistic photocatalysis. The three-dimensional ordered macroporous rhodium doped strontium titanate inverse opal material of the invention can be applied in the field of photocatalysis. Under the action of external forces such as ultrasound, the built-in electric field formed by the spontaneous polarization of the material can effectively separate the photo-induced carriers, so as to enhance the photocatalytic performance and improve the photocatalytic efficiency.

In order to achieve the above object, the specific technical scheme of the invention is as following:

A strontium titanate inverse opal material, characterized in that the preparation method of the strontium titanate inverse opal material comprising the following steps:
  1) self-assembling monodisperse polystyrene microspheres on the conductive side of FTO glass by vertical deposition method to prepare three-dimensional ordered photonic crystal opal template;
  2) immersing the three-dimensional ordered photonic crystal opal template in the solution containing titanium source and strontium source, and then preparing the strontium titanate inverse opal material by calcination.

A rhodium doped strontium titanate inverse opal material, characterized in that the preparation method of the rhodium doped strontium titanate inverse opal material comprising the following steps:
  1) self-assembling monodisperse polystyrene microspheres on the conductive side of FTO glass by vertical deposition method to prepare three-dimensional ordered photonic crystal opal template;
  2) immersing the three-dimensional ordered photonic crystal opal template in the solution containing rhodium source, titanium source and strontium source, and then preparing the rhodium doped strontium titanate inverse opal material by calcination.

A method for catalytic removal of pollutants in water comprising the following steps:
  1) self-assembling monodisperse polystyrene microspheres on the conductive side of FTO glass by vertical deposition method to prepare three-dimensional ordered photonic crystal opal template;
  2) immersing the three-dimensional ordered photonic crystal opal template in the solution containing rhodium source, titanium source and strontium source, and then preparing the rhodium doped strontium titanate inverse opal material by calcination; or immersing the three-dimensional ordered photonic crystal opal template in the solution containing titanium source and strontium source, and then preparing the strontium titanate inverse opal material by calcination;
  3) adding the rhodium doped strontium titanate inverse opal material or strontium titanate inverse opal material to the water containing pollutants, and then irradiating or ultrasonic treating to remove the pollutants in the water.

In the present invention, in step 1), paving the monodisperse polystyrene microsphere emulsion on the conductive side of FTO glass, treating under constant temperature to prepare the three-dimensional ordered photonic crystal opal template. Preferred, ultrasonic cleaning the FTO glass by acetone, ethanol and deionized water successively; the concentration of monodisperse polystyrene microsphere emulsion is 0.125 wt %; more preferred, the particle size of the monodisperse polystyrene microsphere is 250-300 nm, preferably 280 nm; the temperature of constant temperature treatment is 40-50° C., and the time is 45-75 hours.

In the present invention, in step 2), drying before calcination, preferably the drying temperature is 50-70° C., the calcination temperature is 400-650° C., the heating rate is 1-2° C./min and the time is 1.5-2.5 hours; the rhodium source is rhodium chloride or rhodium nitrate, the strontium source is strontium nitrate or strontium acetate, and the titanium source is tetra-n-butyl titanate or tetraisopropyl titanate; in the solution containing rhodium source, titanium source and strontium source or containing titanium source and strontium source, the solvent is water, preferably, the solution containing rhodium source, titanium source and strontium source or the solution containing titanium source and strontium source, also contains acetic acid and citric acid. Preferably, in the rhodium doped strontium titanate inverse opal material, the doping amount of rhodium is 0-1% of the molar amount of strontium.

In the present invention, in step (3), the pollutant is bisphenol A; the irradiating treatment is treating with a 300 W xenon light, and the power of ultrasonic treatment is 100-150 W; it is preferred that while irradiating, the ultrasonic treatment is provided at the same time to give external mechanical vibration to excite the piezoelectric effect inside the material. Under the action of external force, the built-in electric field formed by the spontaneous polarization of the material can effectively separate the photo-induced carriers, so as to enhance the photocatalytic performance and improve the efficiency of photocatalysis.

In the rhodium doped strontium titanate inverse opal material of the invention, perovskite strontium titanate is one of the most important n-type semiconductors, which has a large number of photocatalytic sites, excellent light corrosion resistance, thermal stability, good structural stability as a metal load body and low cost. The periodic structure of inverse opal material shows obvious slow photon effect, which can prohibit the propagation of light with some wavelengths in the material and produce stopband reflection, and the slow photon effect can also increase the path length of light, enhance the photon matter interaction and further improve the light energy conversion efficiency of semiconductors.

The invention discloses the application of the strontium titanate inverse opal material or rhodium doped strontium titanate inverse opal material in removing organic pollutants. The preferred organic pollutant is bisphenol A.

Due to the use of the above technical scheme, the invention has the following advantages compared with the prior art:

1. In the $ABO_3$ perovskite structure of the invention, the dopant can occupy its A and B positions, and can maintain a stable perovskite structure after doping, and the selection of dopant has great flexibility, in particular, the rhodium doped strontium titanate inverse opal material of the invention can move the light response range from the ultraviolet light region to the visible light region and effectively improve the photocatalytic activity of strontium titanate in the visible light region, and solve the defect that in many existing solutions, the transition metal elements are doped into the strontium titanate lattice, but can not move the light response range of strontium titanate from the ultraviolet light region to the visible light region.
2. The strontium titanate inverse opal material disclosed by the invention is prepared by self-assembling polystyrene microspheres on FTO substrate, then preparing doped strontium titanate precursor, filling the precursor into the gap of opal template through capillary force, and removing the template through calcination, so as to obtain three-dimensional pore structure. The periodic structure of rhodium doped strontium titanate inverse opal can increase the path length of light, enhance the photon matter interaction, further enhance the absorption of light, and make use of more photons, so as to further improve the light energy conversion efficiency of semiconductors and enhance the photocatalytic performance of materials. At the same time, its three-dimensional ordered porous structure has a larger specific surface area than ordinary nanoparticle materials, which is conducive to exposing the active site of the catalyst and has multiple scattering effects on the propagation of light in it.
3. The rhodium doped strontium titanate inverse opal disclosed by the invention is also a piezoelectric material. Due to its spontaneous polarization, an electric field is formed in strontium titanate under the action of external force, which can effectively separate electrons and holes, realize the photocatalytic decomposition of organic pollutants under the action of external force and improve the photocatalytic activity. At the same time, it does not have the toxicity of traditional piezoelectric material lead zirconate titanate (PZT), and the cost is low, which is conducive to further popularization and application.

DETAILED DESCRIPTION OF THE INVENTION

Figure 1:
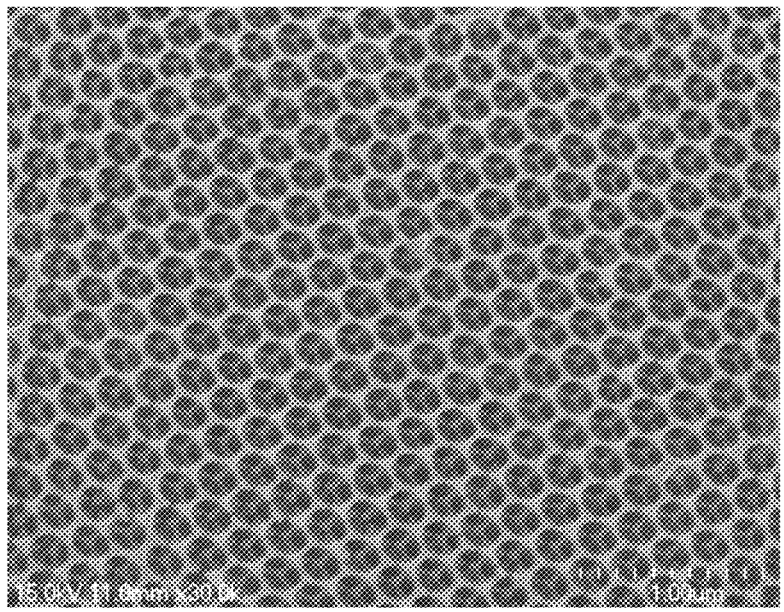
FIG. 1 is a scanning electron microscope diagram of strontium titanate inverse opal ($SrTiO_3$ IO) in embodiment 3.

The invention modifies strontium titanate nano materials by doping transition metal elements and micro morphology regulation, rhodium doped strontium titanate inverse opal (Rh $SrTiO_3$ IO) is prepared by template calcination to adjust the band gap of strontium titanate and make it respond to visible light; at the same time, it can use the unique structural characteristics of three-dimensional ordered macropores of inverse opal to improve light absorption, expose more active sites and enhance photocatalytic performance. In addition, the three-dimensional ordered macropore rhodium doped strontium titanate inverse opal material of the invention is a good piezoelectric material. In the photocatalytic process, the invention applies external mechanical force to it to generate a built-in polarization electric field to further separate photogenerated electron holes, so as to further improve the photocatalytic performance and realize the efficient removal of organic pollutants in water body.

In the present invention, the preparation method of the strontium titanate inverse opal material is as follows:
1) self-assembling monodisperse polystyrene microspheres on the conductive side of FTO glass by vertical deposition method to prepare three-dimensional ordered photonic crystal opal template;

2) immersing the three-dimensional ordered photonic crystal opal template in the solution containing titanium source and strontium source, and then preparing the strontium titanate inverse opal material by calcination.

The preparation method of the rhodium doped strontium titanate inverse opal material is as follows:

1) self-assembling monodisperse polystyrene microspheres on the conductive side of FTO glass by vertical deposition method to prepare three-dimensional ordered photonic crystal opal template;

2) immersing the three-dimensional ordered photonic crystal opal template in the solution containing rhodium source, titanium source and strontium source, and then preparing the rhodium doped strontium titanate inverse opal material by calcination.

Preferably, the solution containing rhodium source, titanium source and strontium source is composed of acetic acid, citric acid, water, rhodium source, titanium source and strontium source. The solution containing titanium source and strontium source is composed of acetic acid, citric acid, water, titanium source and strontium source.

The invention is further described below in combination with embodiments.

Embodiment 1

Preparation of photonic crystal opal template: prepared by vertical deposition method. Firstly, FTO glass is sonicated with acetone, ethanol and deionized water successively for 20 min; dispersing the freeze-dried 280 nm polystyrene microsphere powder into deionized water to obtain 0.125 wt % monodisperse polystyrene microsphere emulsion. Then, 1 ml monodisperse polystyrene microspheres with a concentration of 0.125 wt % is collected in a weighing bottle, and the ultrasonic clean FTO glass is vertically placed into the weighing bottle with the conductive side upside, and leaning the weighing bottle properly so that the liquid surface just comes into contact with the edge of the FTO glass substrate (the monodisperse polystyrene microsphere emulsion is laid on the conductive side of the FTO glass), and then is put into the electrothermal incubator at 45° C. for two days (48 hours) to produce a three-dimensional ordered photonic crystal template, for usage in embodiment 2 to embodiment 5.

Embodiment 2

Preparation of strontium titanate inverse opal: firstly, 0.01 mol tetrabutyl titanate is mixed with 10 ml acetic acid, and then 10 ml deionized water is added to the solution under continuous stirring. Then, 10 ml of 1M $Sr(NO_3)_2$ is added dropwise to the above solution. Finally, add 10 ml of 2M citric acid solution. The obtained solution is stirred at room temperature for another 30 minutes to obtain a clear solution, which is recorded as solution A. The prepared polystyrene opal template is soaked in solution A, then dried in an oven at 60° C., and then the dried precursor template is calcined in air in a tubular furnace for 2 hours at 650° C., The temperature rise rate is 2° C./min (room temperature rises to 650° C.), and the strontium titanate inverse opal thin film photocatalyst ($SrTiO_3$ IO) is obtained by natural cooling. It can be seen from FIG. 1 that the strontium titanate inverse opal has a three-dimensional ordered macropore structure, uniform pore size and regular arrangement.

Embodiment 3

Preparation of 0.3 mol % rhodium doped strontium titanate inverse opal: firstly, tetrabutyl titanate is mixed with 10 ml acetic acid, and then 10 ml deionized water is added to the solution under continuous stirring. After that, drop 10 ml of a mixed solution of 1M strontium nitrate and rhodium trichloride trihydrate to the above solution, (the sum of the moles of tetrabutyl titanate and rhodium trichloride trihydrate is the moles of strontium nitrate), and the moles of rhodium trichloride trihydrate is 0.3% of the moles of strontium nitrate. Finally, add 10 ml of 2 M citric acid solution. Stir the resulting solution at room temperature for another 30 minutes to obtain a clear solution, which is recorded as solution A. Immerse the prepared polystyrene opal template in solution A, Then it is dried in an oven at 60° C., and the dried precursor template is calcined in the air in a tubular furnace for 2 hours. The calcination temperature is 650° C., and the heating rate is 2° C./min (room temperature rose to 650° C.). Rhodium doped strontium titanate inverse opal thin film photocatalyst (0.3 mol % Rh—Sr $TiO_3$ IO) is obtained by natural cooling.

Embodiment 4

Figure 2:
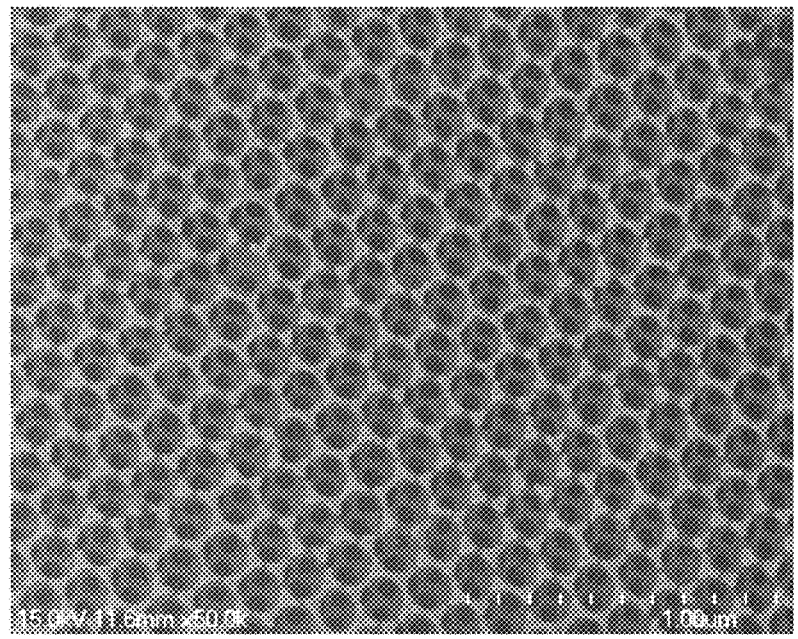
FIG. 2 is a scanning electron microscope diagram of rhodium doped strontium titanate inverse opal (Rh—$SrTiO_3$ IO) in embodiment 4.
Figure 3:
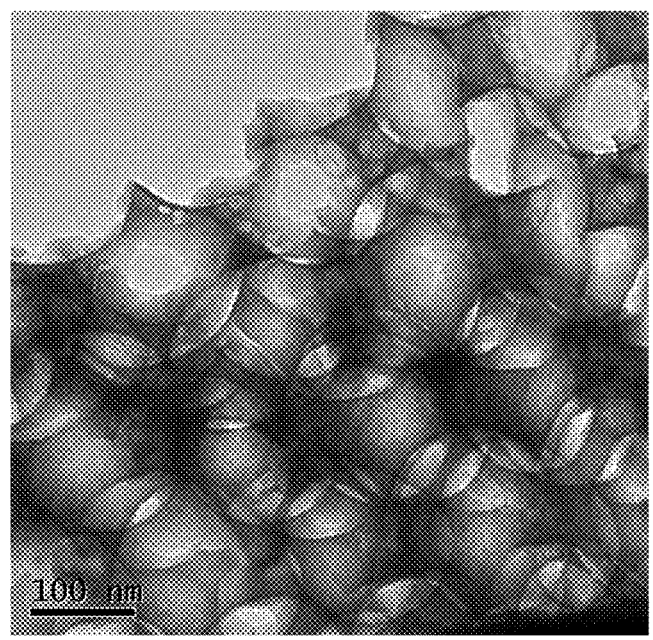
FIG. 3 is a transmission electron microscope diagram of rhodium doped strontium titanate inverse opal (Rh-—$SrTiO_3$ IO) in embodiment 4.
Figure 4:
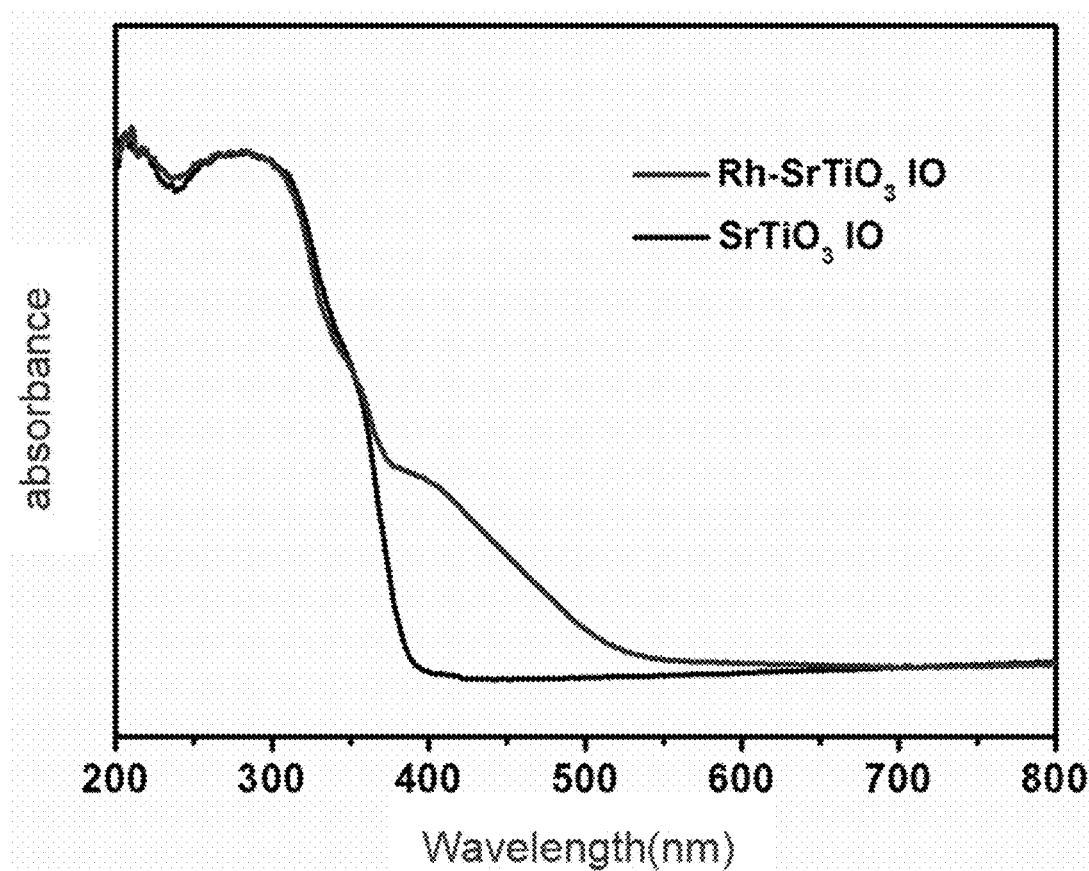
FIG. 4 is a UV-vis absorption spectrum of rhodium doped strontium titanate inverse opal (Rh—$SrTiO_3$ IO) in embodiment 4.

Preparation of 0.5 mol % rhodium doped strontium titanate inverse opal: firstly, tetrabutyl titanate is mixed with 10 ml acetic acid, and then 10 ml deionized water is added to the solution under continuous stirring. After that, drop 10 ml of a mixed solution of 1 M strontium nitrate and rhodium trichloride trihydrate to the above solution, (the sum of the moles of tetrabutyl titanate and rhodium trichloride trihydrate is the moles of strontium nitrate), and the moles of rhodium trichloride trihydrate is 0.5% of the moles of strontium nitrate. Finally, add 10 ml of 2 m citric acid solution. Stir the resulting solution at room temperature for another 30 minutes to obtain a clear solution, which is recorded as solution A. Immerse the prepared polystyrene opal template in solution A, then it is dried in an oven at 60° C., and the dried precursor template is calcined in the air in a tubular furnace for 2 hours at 650° C., the temperature rise rate is 2° C./min (room temperature rises to 650° C.), and the rhodium doped strontium titanate inverse opal thin film photocatalyst (0.5 mol % Rh—$SrTiO_3$ IO) is obtained by natural cooling. It can be seen from FIG. 2 that the 0.5 mol % Rhodium doped strontium titanate inverse opal still maintains a stable skeleton, uniform pores and regular structure.

Embodiment 5

Preparation of 1.0 mol % rhodium doped strontium titanate inverse opal: firstly, tetrabutyl titanate is mixed with 10 ml acetic acid, and then 10 ml deionized water is added to the solution under continuous stirring. After that, drop 10 ml of a mixed solution of 1 M strontium nitrate and rhodium trichloride trihydrate to the above solution, (the sum of the moles of tetrabutyl titanate and rhodium trichloride trihydrate is the moles of strontium nitrate), and the moles of rhodium trichloride trihydrate is 1.0% of the moles of strontium nitrate. Finally, add 10 ml of 2 M citric acid solution. Stir the resulting solution at room temperature for another 30 minutes to obtain a clear solution, which is recorded as solution A. Immersing the prepared polystyrene opal template in solution A, then it is dried in an oven at 60° C., and the dried precursor template is calcined in air in a tubular furnace for 2 h. The calcination temperature is 650° C., and the heating rate is 2° C./min (room temperature rose to 650° C.), and the rhodium doped strontium titanate inverse opal thin film photocatalyst (1.0 mol % Rh—SrTiO$_3$ IO) is obtained by natural cooling.

Comparison Example:

Preparation of rhodium doped strontium titanate nanoparticles: synthesized by hydrothermal method, tetrabutyl titanate is dissolved in 20 ml ethylene glycol to form a clear solution, then 20 ml of mixed aqueous solution of 0.5 M strontium nitrate and rhodium trichloride trihydrate and 10 ml of 5 M sodium hydroxide solution are added dropwise under magnetic stirring (the molar ratio of strontium nitrate, tetrabutyl titanate and rhodium trichloride trihydrate is 1:0.995:0.005). After stirring for 30 minutes, the mixture is added to a 100 ml high-pressure reactor and reacted at 200° C. for 24 hours. After the reaction, the product is washed with deionized water and absolute ethanol for several times until the pH reached 7. Then, the product is dried at 70° C. overnight to obtain rhodium doped strontium titanate nanoparticles particles (Rh—SrTiO$_3$ NPs).

Embodiment 6

Figure 5:
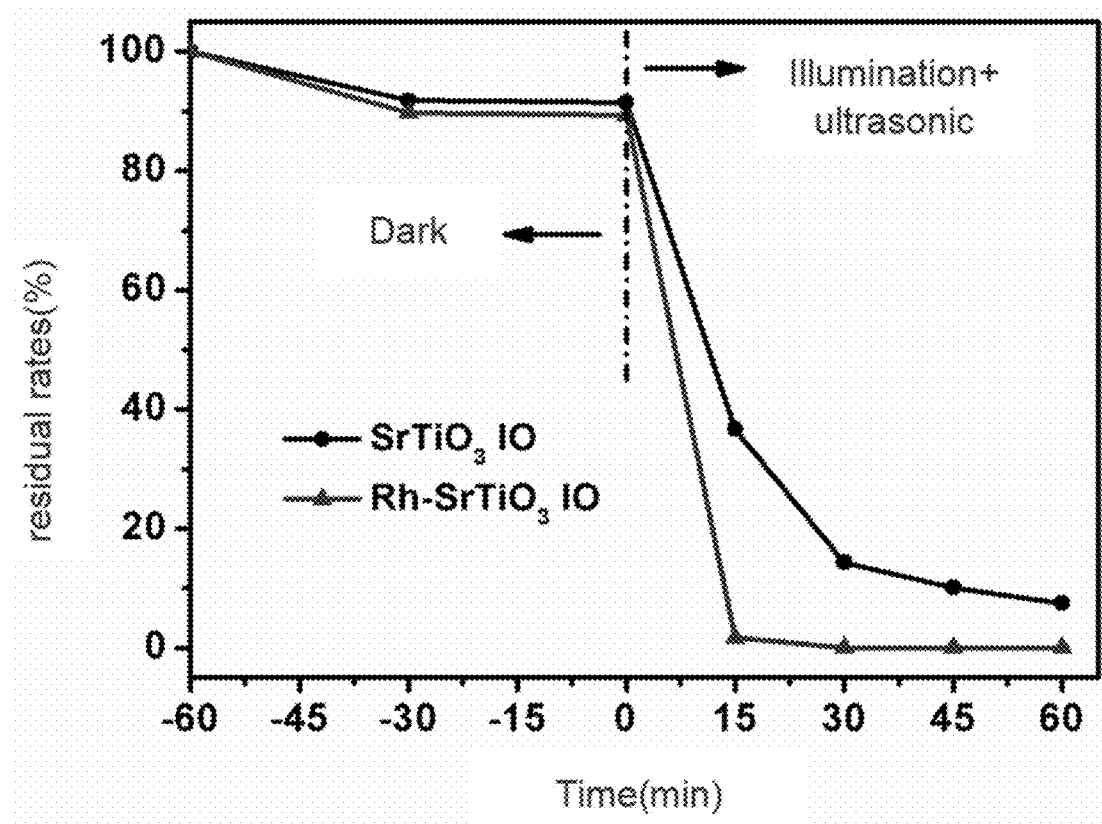
FIG. 5 is an effect diagram of degradation of bisphenol A by strontium titanate inverse opal ($SrTiO_3$ IO) and rhodium doped strontium titanate inverse opal (Rh—$SrTiO_3$ IO) in embodiment 6.

Piezoelectric photocatalytic degradation of bisphenol A by 0.5 mol % Rh—SrTiO$_3$ IO : weigh 6 mg of the photocatalyst 0.5 mol % Rh—SrTiO$_3$ IO obtained in embodiment 4 and place it in 10 ml bisphenol A aqueous solution with a concentration of 10 mg/L. Stir in dark for one hour to reach adsorption desorption equilibrium. After balance, place the test tube containing bisphenol A aqueous solution obliquely in the ultrasonic cleaner, irradiate the catalyst with a 300 W xenon lamp, turn on the ultrasonic cleaner, adjust the power to 150 W, sample 1 mL every 15 minutes, and record the retention time by HPLC. Record the peak area of the liquid phase corresponding to the retention time to obtain the concentration of bisphenol A in the corresponding water sample. FIG. 5 is a graph of the relationship between the residue rate of bisphenol A and time. As can be seen from the figure, after adding 0.5 mol % Rh—SrTiO$_3$ IO photocatalyst and applying light and ultrasound at the same time, after 30 min of light, Bisphenol A in the aqueous solution is completely removed (residual 0%). The catalyst materials of other embodiments are tested by the same method. After 30 min of illumination, the residual rates of bisphenol A in the aqueous solution are 15% in embodiment 2, 7% in embodiment 3, 9% in embodiment 5 and 43% in the control ratio.

Replacing the rhodium doping in embodiment 4 with ruthenium doping in the same molar amount. The 0.5 mol % Ru—SrTiO$_3$ IO obtained by the same preparation method is subjected to the same piezoelectric synergistic photocatalytic degradation experiment of bisphenol A. after 30 min of illumination, 13% of bisphenol A remained in the aqueous solution.

Changing the particle size of the polystyrene microspheres in embodiment 1 to 420 nm. The other methods are the same to obtain 0.5 mol % Rh—SrTiO$_3$ IO. After the same piezoelectric synergistic photocatalytic degradation experiment of bisphenol A, 6% of bisphenol A remained in the aqueous solution after 30 min of illumination. It shows that the pore size of the template has a certain influence on the slow photon effect (light absorption and utilization) of inverse opal, and then affects the photocatalytic performance of the material.

Replacing the ultrasound in embodiment 6 by magnetic stirring (200 rpm), and the other methods are the same. 0.5 mol % Rh—SrTiO$_3$ IO is subjected to the same photocatalytic degradation experiment of bisphenol A. After 30 min of illumination, 52% of bisphenol A remained in the aqueous solution, indicating that the mechanical stress caused by ultrasonic vibration plays a great role in the photocatalytic degradation experiment of bisphenol A.

The invention discloses a preparation method of rhodium doped strontium titanate inverse opal material and its piezoelectric synergistic photocatalytic removal of organic pollutants in water (bisphenol A) application. First, polystyrene is prepared by soap-free emulsion polymerization, and polystyrene opal is obtained by vertical deposition method. A new inorganic nano material of rhodium doped strontium titanate inverse opal is obtained by one-step calcination. In the rhodium doped strontium titanate inverse opal prepared by this method, the transition metal $Rh^{3+}$ containing d orbital electrons can be doped into the lattice of strontium titanate. It can effectively reduce the band gap of strontium titanate, make it have visible light response, and solve the problem that strontium titanate only responds to ultraviolet light, which limits its application. At the same time, the strontium titanate inverse opal prepared by the invention is a three-dimensional periodic pore structure and has a slow photon effect, so that it shows better photocatalytic performance compared with ordinary porous materials. In addition, strontium titanate is also a good piezoelectric material. In the process of photocatalysis, external mechanical pressure can be applied to it to generate a built-in polarization electric field, so that the photogenerated electron holes can be further separated. Therefore, the low band gap when doped and its own piezoelectric properties enable strontium titanate to make full use of the slow photon effect and vibration energy to catalyze the degradation of organic pollutants without coupling it with other materials or using external bias, so as to reduce the use cost.

What we claim is:
1. A strontium titanate inverse opal material, characterized in that the preparation method of the strontium titanate inverse opal material comprising the following steps:
　　1) self-assembling monodisperse polystyrene microspheres on the conductive side of an FTO glass by a vertical deposition method to prepare a three-dimensional ordered photonic crystal opal template;
　　2) immersing the three-dimensional ordered photonic crystal opal template in a solution containing titanium source and strontium source, and then preparing the strontium titanate inverse opal material by calcination,
　　wherein in step 1), the particle size of monodisperse polystyrene microspheres is 250-300 nm; in step 2), the calcination temperature is 400-650° C. and drying before calcination;
　　wherein said strontium source is strontium nitrate or strontium acetate; said titanium source is tetra-n-butyl titanate or tetraisopropyl titanate;
　　wherein in the solution containing titanium source and strontium source, the solvent is water; the solution containing titanium source and strontium source also contains acetic acid and citric acid; and
　　wherein transition metal $Rh^{3+}$ is doped into a lattice of the strontium titanate inverse opal material, and the strontium titanate inverse opal material has a three-dimen- sional periodic pore structure and a slow photon effect, and is a piezoelectric material.

2. A method for removing organic pollutants, comprising:
providing the strontium titanate inverse opal material according to claim 1; and
applying the strontium titanate inverse opal material to remove the organic pollutants.

* * * * *